United States Patent
Han (10) Patent No.: US 9,532,308 B2
(45) Date of Patent: Dec. 27, 2016

(54) METHOD AND USER EQUIPMENT FOR DISCONTINUOUS RECEPTION CONFIGURATION

(71) Applicant: Huawei Technologies Co., Ltd., Shenzhen, Guangdong (CN)

(72) Inventor: Guanglin Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 14/287,849

(22) Filed: May 27, 2014

(65) Prior Publication Data
US 2014/0269480 A1   Sep. 18, 2014

Related U.S. Application Data

(63) Continuation of application No. PCT/CN2012/085134, filed on Nov. 23, 2012.

(30) Foreign Application Priority Data

Nov. 24, 2011   (CN) .......................... 2011 1 0377895

(51) Int. Cl.
*H04W 52/02* (2009.01)
*H04W 76/04* (2009.01)
*H04W 88/02* (2009.01)

(52) U.S. Cl.
CPC ....... *H04W 52/0216* (2013.01); *H04W 76/048* (2013.01); *H04W 88/02* (2013.01)

(58) Field of Classification Search
None
See application file for complete search history.

(56) References Cited

U.S. PATENT DOCUMENTS

2009/0052367 A1* 2/2009 Cai .......................... H04L 1/18
                                                         370/315
2010/0091693 A1* 4/2010 Pelletier ............ H04W 52/0216
                                                         370/311

(Continued)

FOREIGN PATENT DOCUMENTS

CN          101583178 A      11/2009
CN          101730152 A       6/2010

(Continued)

OTHER PUBLICATIONS

"Activation of DRX," 3GPP TSG RAN WG2 #61 bis, Shenzhen, China, R2-081698, 3rd Generation Partnership Project, Valbonne, France (Mar. 31-Apr. 4, 2008).

(Continued)

*Primary Examiner* — Jenee Williams
(74) *Attorney, Agent, or Firm* — Leydig, Voit & Mayer, Ltd.

(57) ABSTRACT

The present invention discloses a method for discontinuous reception configuration, the method includes: receiving a discontinuous reception DRX configuration message from an eNodeB, where the DRX configuration message includes at least one of the following configuration parameters: new DRX cycle configuration and new on-duration configuration; applying the DRX cycle configuration, and determining a start time of the new on-duration configuration according a start state of an on-duration timer, or determining an application time of the new DRX cycle configuration. Correspondingly, the present invention further provides a user equipment. Implementing the method and user equipment provided by the present invention can solve the problem of desynchronization of the DRX status between the eNodeB and the UE, and avoid waste of scheduling resources.

8 Claims, 3 Drawing Sheets

(56) References Cited

U.S. PATENT DOCUMENTS

| | | | | |
|---|---|---|---|---|
| 2010/0113008 A1* | 5/2010 | Wang | ........................ | H04L 1/20 455/423 |
| 2010/0118815 A1* | 5/2010 | Kim | .................. | H04W 52/0216 370/329 |
| 2010/0150091 A1* | 6/2010 | Yu | ........................ | H04W 72/042 370/329 |
| 2010/0322173 A1* | 12/2010 | Marinier | .............. | H04W 76/048 370/329 |
| 2011/0002262 A1* | 1/2011 | Wang | ................... | H04L 1/1812 370/328 |
| 2011/0176513 A1* | 7/2011 | Yi | ........................ | H04W 74/002 370/331 |
| 2011/0199910 A1 | 8/2011 | Oh et al. | | |
| 2011/0243047 A1* | 10/2011 | Dayal | ................... | H04W 16/14 370/311 |
| 2011/0267957 A1* | 11/2011 | Du | ........................ | H04L 5/0007 370/241 |
| 2012/0140691 A1 | 6/2012 | Wu | | |
| 2012/0213137 A1* | 8/2012 | Jeong | ................ | H04W 52/0212 370/311 |
| 2014/0092851 A1 | 4/2014 | Wang et al. | | |

FOREIGN PATENT DOCUMENTS

| | | |
|---|---|---|
| CN | 101925161 A | 12/2010 |
| CN | 102119501 A | 7/2011 |
| EP | 2182765 A2 | 5/2010 |
| WO | WO 2010053330 A2 | 5/2010 |

OTHER PUBLICATIONS

"DRX clarification in TDD," 3GPP TSG RAN WG2 #61 bis, Shenzhen, China, R2-081874, $3^{rd}$ Generation Partnership Project, Valbonne, France (Mar. 31-Apr. 4, 2008).

"$3^{rd}$ Generation Partnership Project; Technical Specification Group Radio Access Network; Evolved Universal Terrestrial Radio Access (E-UTRA); Medium Access Control (MAC) protocol specification (Release 10)," 3GPP TS 36.321, V10.3.0, pp. 1-54, $3^{rd}$ Generation Partnership Project, Valbonne, France (Sep. 2011).

* cited by examiner

METHOD AND USER EQUIPMENT FOR DISCONTINUOUS RECEPTION CONFIGURATION

CROSS-REFERENCE TO RELATED APPLICATIONS

This application is a continuation of International Patent Application No. PCT/CN2012/085134, filed on Nov. 23, 2012, which claims priority to Chinese Patent Application No. 201110377895.7, filed on Nov. 24, 2011, both of which are hereby incorporated by reference in their entireties.

TECHNICAL FIELD

The present invention relates to the field of communication, in particular to a method and a user equipment for discontinuous reception configuration.

BACKGROUND

In LTE (Long Term Evolution, long term evolution) technologies, a discontinuous reception (Discontinuous Reception, DRX) mechanism is introduced in order to save energy for a user equipment as much as possible in the case that there is no data to be transmitted. An energy saving mode of the DRX mechanism can be to stop monitoring PDCCH (Physical Downlink Control Channel, physical downlink control channel) in a specific period of time. There are two kinds of DRX: idle DRX and active DRX. Idle DRX can be a discontinuous reception when a user equipment (User Equipment, UE) is in an idle state. Since the user equipment is in the idle state, there is no RRC (Radio Resource Control, radio resource control) connection or user-specific resources, and at this time the user equipment is mainly monitoring a paging channel and a broadcast channel. Through defining a fixed cycle appropriately, the purpose of discontinuous reception can be achieved. However, when the UE needs to monitor a user data channel, it should switch from the idle state to a connection state. Active DRX is a discontinuous reception when a UE is in an RRC connection state, which can optimize resource configuration, and further can save the power of a user equipment without switching the UE to the idle state. For example, in some non-real time applications, there is always a period of time, in which the user equipment does not need to monitor downlink data and relevant process continuously, then the DRX can be applied to this situation.

Active DRX can adopt a manner of coordinating a long cycle and a short cycle to achieve a better effect. In existing LTE DRX process, there exists, within the time interval after starting an on-duration timer and before applying a new DRX configuration parameter, a period of time in which the UE cannot receive a schedule from a base station, and thus the scheduling resource is wasted.

SUMMARY

One aspect of the present invention provides a method for discontinuous reception configuration, the method includes:
receiving a discontinuous reception DRX configuration message from a base station, where the DRX configuration message includes at least one of following configuration parameters: new DRX cycle configuration and new on-duration OnDuration configuration;
applying the new DRX cycle configuration, and determining a start time of the new on-duration configuration according a start state of an on-duration timer, or,
determining an application time of the new DRX cycle configuration.

Another aspect of the present invention provides a user equipment, including:
a receiving module, configured to receive a discontinuous reception DRX configuration message from a base station, wherein the DRX configuration message includes at least one of following configuration parameters: new DRX cycle configuration and new on-duration OnDuration configuration;
a configuration executing module, configured to apply the new DRX cycle configuration received by the receiving module, and determine a start time of the new on-duration configuration according a start state of an on-duration timer, or, determine an application time of the new DRX cycle configuration received by the receiving module.

The embodiments of the present invention have the following beneficial effects: during the switching process of the discontinuous reception DRX cycle, the synchronization between the DRX status of the UE and the DRX status of the eNodeB can be ensured, so that the problem of wasting scheduling resource due to desynchronization between the DRX status of the UE and the DRX status of the eNodeB is solved.

BRIEF DESCRIPTION OF DRAWINGS

In order to illustrate the technical solution of the embodiments of the present invention more clearly, drawings needed for describing the embodiments and the prior art are briefly introduced hereinafter. Apparently, the drawings being described hereinafter are only some embodiments of the present invention, and persons having ordinary skill in the art may still derive other drawings from the accompanying drawings without creative efforts.

DESCRIPTION OF EMBODIMENTS

The following clearly and comprehensively describes the technical solutions in embodiments of the present invention with reference to the accompanying drawings of embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
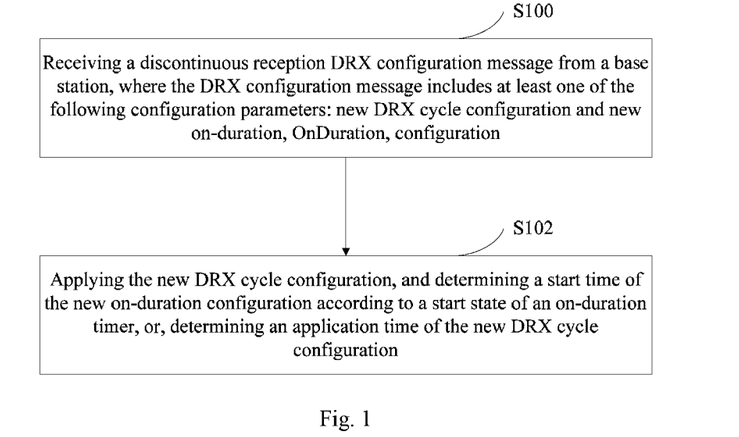
FIG. 1 is a schematic flow diagram of a method for discontinuous reception configuration according to embodiments of the present invention.

Referring to FIG. 1 which shows a schematic flow diagram of a method for discontinuous reception configuration according to embodiments of the present invention, the method includes:

S100, receiving a discontinuous reception DRX configuration message from a base station, where the DRX configuration message includes at least one of the following configuration parameters: new DRX cycle configuration and new on-duration, OnDuration, configuration;

S102, applying the new DRX cycle configuration, and determining a start time of the new on-duration configuration according to a start state of an on-duration timer, or, determining an application time of the new DRX cycle configuration.

In the embodiment of the present invention, a user equipment UE receives a DRX configuration message from a base station, eNodeB, which includes a DRX configuration message sent by the eNodeB, and can further includes a DRX configuration message pre-configured by the eNodeB. The DRX configuration message can be a newly received DRX reconfiguration message, or, can be a newly received DRX configuration message in the case that the DRX cycle is not configured.

The DRX configuration message can be an RRC (Radio Resource Control, radio resource control) message, and also can be other protocol layer messages. The RRC message can include at least one of the following parameters: new DRX cycle configuration, new on-duration (OnDuration) configuration (where, the OnDuration configuration can include an OnDuration length, and can also includes an on-duration start offset), indication information which is configured to indicate the UE to use a set of pre-configured DRX parameters, for example, a pre-configured DRX configuration identifier, where a set of DRX parameters can include a DRX cycle length, an OnDuration length and an on-duration start offset.

Figure 2:
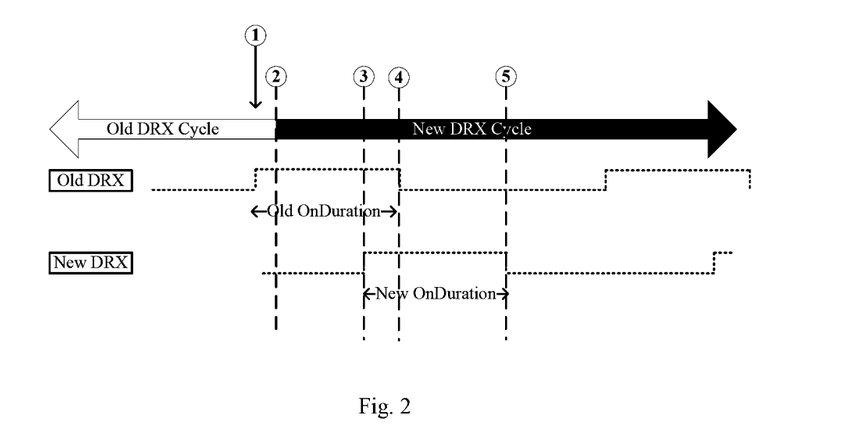
FIG. 2 is a schematic diagram of a first embodiment according to embodiments of the present invention.

Referring to FIG. 2 which shows a schematic diagram of a first embodiment according to embodiments of the present invention, in this embodiment, the method for DRX configuration includes:

at time point 1, receiving a DRX configuration message from an eNodeB, the message can be a RRC message, and include at least one of the following parameters: DRX cycle configuration, on-duration OnDuration configuration (which can include OnDuration length and on-duration start offset), indication information configured to indicate the UE to use a set of pre-configured DRX parameters;

at time point 2, applying new cycle configuration, if the on-duration timer has been started, and the on-duration timer has not expired, and a current subframe satisfies a start condition of the on-duration timer, restart the on-duration timer, and applying the new on-duration configuration.

In this embodiment, the new cycle configuration is applied at time point 2, and at time point 2 and the time after time point 2, if the OnDuration timer has been started in a previous DRX cycle (i.e. an old DRX cycle), and the OnDuration timer has not expired, and the current subframe satisfies the start condition of the on-duration timer, then the on-duration timer is restarted, and the new on-duration configuration is applied. Where the start condition of the on-duration timer includes, if a short DRX cycle (Short DRX cycle) is used, then the condition needed to be satisfied is that [(SFN*10)+subframe number] modulo (shortDRX–Cycle)=(drxStartOffset) modulo (shortDRX–Cycle), where, "SFN" is a system frame number (System Frame Number), "subframe number" is a subframe number, "short DRX-Cycle" is the short DRX cycle, "drxStartOffset" is the start offset of the DRX, "*" is a mathematical operational symbol "multiply", "modulo" represents modulo calculation. If a long DRX cycle is used, then the condition needed to be satisfied is that [(SFN*10)+subframe number] modulo (longDRX–Cycle)=drxStartOffset, where "longDRX-Cycle" is the long DRX cycle. If the start condition of the long DRX cycle or the short DRX cycle is satisfied, and the OnDuration timer has been started and has not expired, then the OnDuration timer is restarted, and the new OnDuration configuration is applied. As for the embodiment, the above condition is satisfied at time point 3, then the OnDuration timer is restarted at time point 3, and the new OnDuration configuration is applied.

In the embodiment of the present invention, the newly configured configuration parameters can be used when the OnDuration timer is started, this can avoid the problem that desynchronization between the DRX status of the UE and the DRX status of the eNodeB (Evolved NodeB, evolved NodeB) occurs within the time interval from starting the on-duration (OnDuration) timer to applying the new DRX configuration parameters and further causes the UE cannot receive the schedule from the eNodeB and schedule resources are wasted, ensure the synchronization of the DRX status between the eNB and the UE, and improve the utilization of the scheduling resources.

Figure 3:
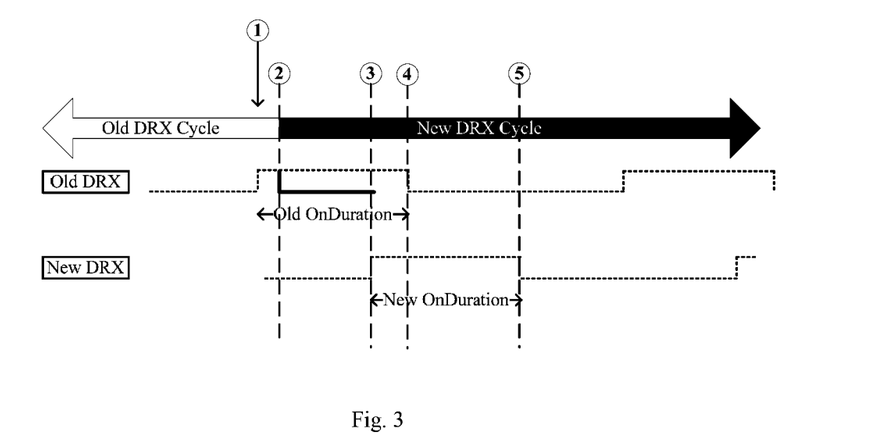
FIG. 3 is a schematic diagram of a second embodiment according to embodiments of the present invention.

Referring to FIG. 3 which shows a schematic diagram of a second embodiment according to embodiments of the present invention, in the this embodiment, the method for DRX configuration includes:

at time point 1, receiving a DRX configuration message from an eNodeB, the message can be a RRC message, and include at least one of the following parameters: DRX cycle configuration, OnDuration configuration (which can include OnDuration length and OnDuration start offset), and indication information configured to indicate the UE to use a set of pre-configured DRX parameters;

at time point 2, applying the new cycle configuration, if the on-duration timer has been started, and, under the new DRX cycle configuration and the new on-duration (OnDuration) configuration, a current subframe is not configured to monitor a physical downlink control channel PDCCH, stopping the on-duration timer which has been started, and stopping monitoring the physical downlink control channel PDCCH, and determining a start time of the new on-duration configuration according to the new DRX cycle configuration.

In this embodiment, at time point 2, the new cycle configuration is applied, and at the time point 2 or at a time after the time point 2, if the on-duration timer has been started in the old DRX cycle, and, under the new DRX cycle configuration and the new on-duration (OnDuration) configuration, the current subframe is not configured to monitor the physical downlink control channel PDCCH, stop the on-duration timer which has been started, and stop monitoring the physical downlink control channel PDCCH. As for this embodiment, at time point 2, if the on-duration timer has been started in the old DRX cycle, and, under the new DRX cycle configuration and the new on-duration (OnDuration) configuration, the current subframe is not configured to monitor the physical downlink control channel PDCCH, then stop the on-duration timer which has been started at time point 2, and stop monitoring the physical downlink control channel PDCCH. After stopping the on-duration timer, in the new DRX cycle, according to the existent start condition of the OnDuration timer, if the start condition is satisfied, then start the on-duration timer at time point 3 shown in FIG. 3 according to the new OnDuration length configuration. The method for DRX configuration provided by the present invention stops executing the old on-duration timer timely after applying the new cycle configuration, which not only saves the power consume of the user equipment UE, but also avoids the new OnDuration timer from being affected by the old OnDuration timer.

Figure 4:
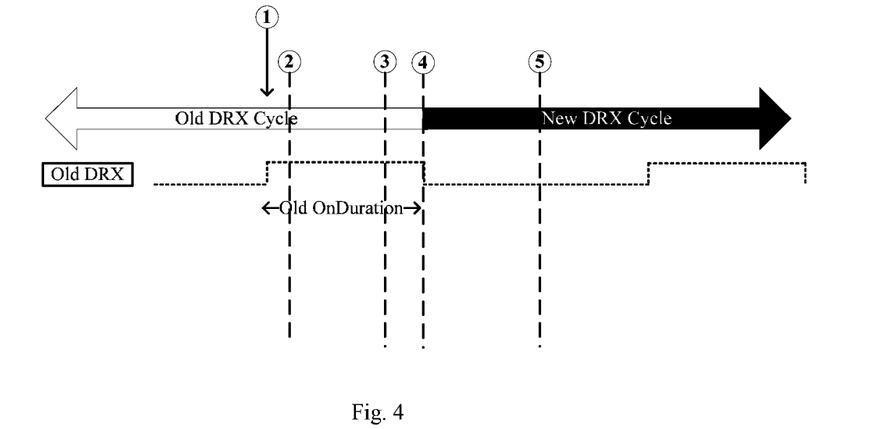
FIG. 4 is a schematic diagram of a third embodiment according to embodiments of the present invention.

Referring to FIG. 4 which shows a schematic diagram of a third embodiment according to embodiments of the present invention. In the present embodiment, the method for DRX configuration includes:

at time point 1, receiving a DRX configuration message from an eNodeB, the message can be a RRC message, and include at least one of the following parameters: DRX cycle configuration, OnDuration configuration, indication information configured to indicate the UE to use a set of pre-configured DRX parameters;

at time point 2, preparing to apply new cycle configuration, if the on-duration timer has been started, applying the new DRX cycle configuration when the on-duration timer expires.

In the present embodiment, before applying the new cycle configuration, at time point 2, during the time period of preparing to apply the new cycle configuration, if, at time point 2, the on-duration timer has been started, then delay applying the new DRX cycle configuration, and not applying the new cycle configuration until the on-duration timer expires. As for this embodiment, the on-duration timer which has been started in the previous DRX cycle expires at time point 4, and then the new DRX cycle configuration begins to be applied at time point 4. According to the existent start condition of the OnDuration timer, the new OnDuration timer can be normally started in the new DRX cycle. The method for DRX configuration provide by the present invention avoids the problem that the new OnDuration timer cannot be started due to the operation of the old OnDuration timer, ensures synchronization of the DRX status between the eNodeB and the UE, and avoids waste of scheduling resources.

Figure 5:
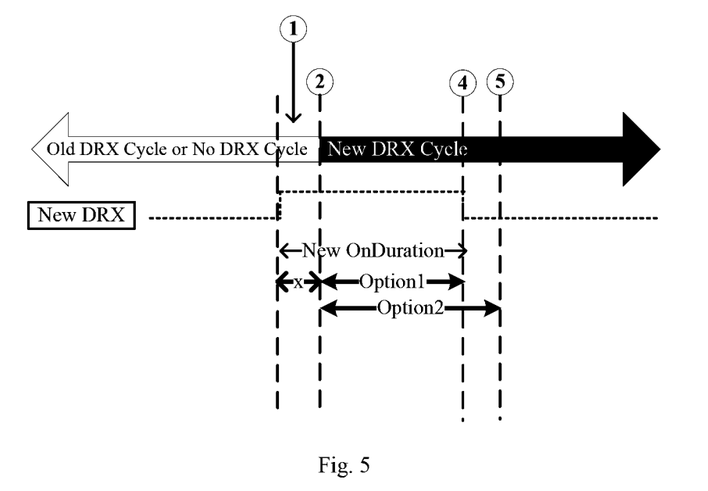
FIG. 5 is a schematic diagram of a fourth embodiment according to embodiments of the present invention.

Referring to FIG. 5 which shows a schematic diagram of a fourth embodiment according to embodiments of the present invention, in this embodiment, the method for DRX configuration can include:

At time point 1, receiving a DRX configuration message from an eNodeB, the message can be a RRC message, and include at least one of the following parameters: DRX cycle configuration, OnDuration configuration, indication information configured to indicate the UE to use a set of pre-configured DRX parameters;

at time point 2, applying the new cycle configuration, determining that the on-duration timer has not been started, determining that at the application time of the new DRX cycle configuration and under the new DRX cycle configuration and the new OnDuration configuration the current subframe is configured to monitor the physical downlink control channel PDCCH, and start the on-duration timer;

The method further comprises:

according to the new on-duration configuration and a time difference between a time when the new DRX configuration cycle is configured and a latest time when the start condition of the on-duration timer is satisfied before the time when the new DRX configuration cycle is configured, determining a duration time for how long the new on-duration timer lasts after being started; or, determining, or determining, according to the new on-duration configuration, a duration time for how long the new on-duration timer lasts after being started; or, determining that the on-duration timer has been started, determining that at the application time of the new DRX cycle configuration and under the new DRX cycle configuration and the new on-duration (OnDuration) configuration the current subframe is configured to monitor the physical downlink control channel PDCCH, and restart the on-duration timer;

The method further comprises:

according to the new on-duration configuration and a time difference between a time when the new DRX configuration cycle is configured and a latest time when the start condition of the on-duration timer is satisfied before the time when the new DRX configuration cycle is configured, determining a duration time for how long the new on-duration timer lasts after being restarted; or, according to the new on-duration configuration, determining the duration time for how long the new on-duration timer lasts after being restarted.

In some embodiments of the present invention, start the on-duration timer, when apply the new cycle configuration at time point 2, determine that the on-duration timer has not been started (a scenario where the on-duration timer has not been successfully started at the OnDuration start time) and determine that at the application time of the new DRX cycle configuration (i.e. time point 2) and under the new DRX cycle configuration and the new on-duration (OnDuration) configuration the current subframe is configured to monitor the physical downlink control channel PDCCH. In embodiments of the present invention, start of the OnDuration timer can include: according to the new on-duration configuration and the time difference x between the time when the new DRX configuration cycle is configured and the latest time when the start condition of the on-duration timer is satisfied before the time when the new DRX configuration cycle is configured, determining the duration time (see Option 1 shown in FIG. 5) for how long the new on-duration timer lasts after being started, or, according to the new on-duration configuration, determining the duration time (see Option 2 shown in FIG. 5) for how long the new on-duration timer lasts after being started.

In some other embodiments of the present invention, apply the new cycle configuration at time point 2, and determine that the on-duration timer has been started (a scenario where the on-duration timer is successfully started at the OnDuration start time), determine that at the application time (i.e. time point 2) of the new DRX cycle configuration and under the new DRX cycle configuration and the new on-duration OnDuration configuration the current subframe is configured to monitor the physical downlink control channel PDCCH, and restart the on-duration timer. In the embodiment of the present invention, restart the on-duration timer can includes: according to the new on-duration configuration, the time difference x between a time when the new DRX configuration cycle is configured and a latest time when the start condition of the on-duration timer is satisfied before the time when the new DRX configuration cycle is configured, determining a duration time (see Option 1 shown in FIG. 5) for how long the new on-duration timer lasts after being restarted, or, according to the new on-duration configuration, determining a duration time (see Option 2 shown in FIG. 5) for how long the new on-duration timer lasts after being restarted.

In the embodiment of the method for DRX configuration according to the present invention, the OnDuration timer can be started even in the case that the current cycle configuration time point misses the start time of the OnDuration timer, which ensures the synchronization of the DRX status between the eNodeB and the UE and avoid waste of scheduling resources.

The above illustrates the method for discontinuous reception configuration of the present invention with reference to the embodiments and the accompany drawings, and the following will illustrate the structure of the user equipment for discontinuous reception configuration with reference to the embodiments and the accompany drawings.

Figure 6:
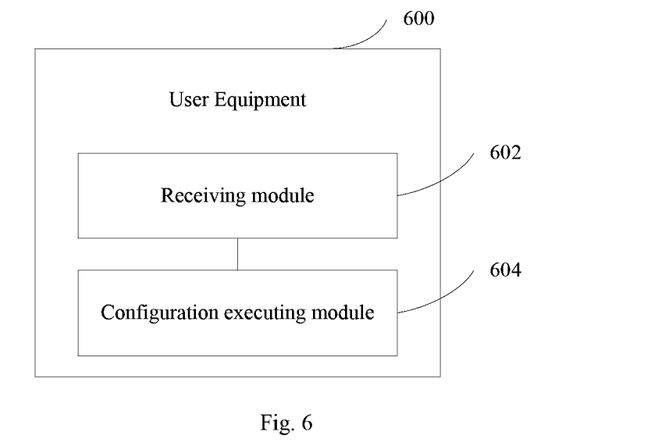
FIG. 6 is a schematic structural diagram of a user equipment according to embodiments of the present invention.

Referring to FIG. 6 which shows a schematic structure diagram of a user equipment for discontinuous reception configuration according to an embodiment of the present invention, the user equipment 600 includes:

a receiving module 602, configured to receive a discontinuous reception DRX configuration message from a base station, where the DRX configuration message includes at least one of the following configuration parameters: new DRX cycle configuration and new on-duration (OnDuration) configuration;

a configuration executing module 604, configured to apply the new DRX cycle configuration received by the receiving module, and determine, according to a start state of an on-duration timer, a start time of the new on-duration configuration of the DRX configuration message received by the receiving module, or, determine an application time of the new DRX cycle configuration received by the receiving module.

In the embodiment of the present invention, a user equipment receives from a base station eNodeB a DRX configuration message, which includes a DRX configuration message sent by the eNodeB, and can further includes a DRX configuration message pre-configured by the eNodeB. The DRX configuration message can be a DRX reconfiguration message newly received by the user equipment, or can be a DRX configuration message newly received by the user equipment in the case that the DRX cycle is not configured.

The DRX configuration message can be an RRC (Radio Resource Control, radio resource control) message, and also can be other protocol layer messages. The RRC message can include at least one of the following parameters: DRX cycle configuration, OnDuration configuration (which can include the OnDuration length and the OnDuration start offset), indication information which is configured to indicate the UE to use a set of pre-configured DRX parameters, for example, a pre-configured DRX configuration identifier, where the set of DRX parameters can include DRX cycle length, on-duration (OnDuration) length and the OnDuration start offset.

In the embodiment as shown in FIG. 2, the configuration executing module can include a first configuration executing submodule. In this embodiment, at time point 1, the receiving module receives a DRX configuration message from an eNodeB, and the message can be a RRC message and include at least one of the following parameters: DRX cycle configuration, OnDuration configuration, indication information configured to indicate the UE to use a set of pre-configured DRX parameters. At time point 2, the configuration executing module applies the new cycle configuration, at time point 2 and the time after time point 2, if the on-duration timer has been started and the on-duration timer has not expired, and a current subframe meets the start condition of the on-duration timer, then the first configuration executing submodule restarts the on-duration timer and applies the new on-duration configuration. Where the start condition of the on-duration timer includes: if a short DRX cycle is used, then the condition needed to be met is that [(SFN*10)+subframe number] modulo (shortDRX−Cycle)= (drxStartOffset) modulo (shortDRX−Cycle); if a long DRX cycle is used, then the condition needed to be met is that [(SFN*10)+subframe number] modulo (longDRX-Cycle)= drxStartOffset. If the start condition of the long DRX cycle or the short DRX cycle is satisfied, as for this embodiment time point 3 meets the above conditions, then the first configuration executing submodule restarts the on-duration timer at time point 3 and applies the new on-duration configuration. The configuration executing module provided by the present invention can start a new on-duration timer even in the case that the old OnDuration timer which has been started in the previous DRX cycle is not executed completely, which ensure the synchronization of the DRX status between the eNodeB and the UE and avoids waste of scheduling resources.

In the embodiment as shown in FIG. 3, the configuration executing module can include a second configuration executing submodule. In this, at time point 1, the receiving module receives a DRX configuration message from an eNodeB, and the message can be a RRC message and include at least one of the following parameters: DRX cycle configuration, OnDuration configuration, indication information configured to indicate the UE to use a set of pre-configured DRX parameters. At time point 2, the configuration executing module applies the new cycle configuration, at time point 2 and the time after time point 2, if the on-duration timer has been started and, under the new DRX cycle configuration and the new on-duration (OnDuration) time configuration the current subframe is not configured to monitor the physical downlink control channel PDCCH, the second configuration executing submodule stops the on-duration timer which has been started, and stops monitoring the physical downlink control channel PDCCH; in new DRX cycle, the second configuration executing submodule can start the OnDuration timer normally according to the existent start condition of the OnDuration timer, as for this embodiment, the new OnDuration timer is started at time point 3 according to the new OnDuration configuration. The configuration executing module provided by the present invention stops executing the old OnDuration timer timely after applying the new cycle configuration, which can not only save the power consume of the user equipment UE, but also avoid the new OnDuration timer from being affected by the old OnDuration timer.

In the embodiment as shown in FIG. 4, the configuration executing module can include a third configuration executing submodule. In this embodiment, at time point 1, the receiving module receives a DRX configuration message from an eNodeB, and the message can be a RRC message and include at least one of the following parameters: DRX cycle configuration, OnDuration configuration, indication information configured to indicate the UE to use a set of pre-configured DRX parameters. At time point 2, preparing to apply the new cycle configuration, if the on-duration timer has been started in the old DRX cycle, the third configuration executing submodule begin to apply the new DRX cycle configuration when the on-duration timer expires. As for this embodiment, the new cycle configuration begins to be applied at time point 4. The configuration executing module provide by the present invention avoids the problem that the new on-duration timer cannot be started due to the operation of the old on-duration timer, ensures the synchronization of the DRX status between the eNodeB and the UE, and avoids the waste scheduling resources.

In the embodiment as shown in FIG. 5, the configuration executing module can include a fourth configuration executing submodule. In this, at time point 1, the receiving module receives a DRX configuration message from an eNodeB, and the message can be a RRC message and include at least one of the following parameters: DRX cycle configuration, OnDuration configuration, indication information configured to indicate the UE to use a set of pre-configured DRX parameters.

In some embodiments of the present invention, the configuration executing module applies the new cycle configuration at time point 2, and the fourth configuration executing submodule determines that the on-duration timer has not been started (the OnDuration timer is not successfully started at the start time), determines that at the application time (i.e. time point 2) of the new DRX cycle configuration received by the reception module and under the new DRX cycle configuration and the new on-duration (OnDuration) configuration the current subframe is configured to monitor the physical downlink control channel PDCCH, starts the on-duration timer. In the embodiment of the present invention, the fourth configuration executing submodule can determine the duration time (see Option 1 shown in FIG. 5) for how long the new on-duration timer lasts after being started, according to the new on-duration configuration and a time difference x between a time when the new DRX configuration cycle is configured and a latest time when the start condition of the on-duration timer is satisfied before the time when the new DRX configuration cycle is configured; or determine the duration time (see Option 2 shown in FIG. 5) for how long the new on-duration timer lasts after being started, according to the new on-duration configuration.

In some other embodiments of the present invention, the configuration executing module applies the new cycle configuration at time point 2, and the fourth configuration executing submodule determines that the on-duration timer has been started (a scenario where the on-duration timer has been successfully started at the OnDuration start time), determines that at the application time (i.e. time point 2) of the new DRX cycle configuration received by the reception module and under the new DRX cycle configuration and the new on-duration (OnDuration) configuration the current subframe is configured to monitor the physical downlink control channel PDCCH, restarts the on-duration timer. In the embodiment of the present invention, the fourth configuration executing submodule can determine the duration time (see Option 1 shown in FIG. 5) for new how long the on-duration timer lasts after being restarted, according to the new on-duration configuration, a time difference x between a time when the new DRX configuration cycle is configured and the latest time when the start condition of the on-duration timer is satisfied before the time when the new DRX configuration cycle is configured; or, determine the duration time (see Option 2 shown in FIG. 5) for how long the new on-duration timer lasts after being restarted, according to the new on-duration configuration.

The configuration executing module of the present invention can start the OnDuration timer even in the case that the current cycle configuration time point misses the start time of the OnDuration timer, which ensures the synchronization of the DRX status between the eNodeB and the UE and avoids waste of scheduling resources.

To sum up, the method and the user equipment for discontinuous reception configuration provided by the embodiment of the present invention can solve the problem of out-of-synchronization of the DRX status of the eNodeB and the UE, such that to avoid the problem of wasting scheduling resource.

Persons of ordinary skill in the art may understand that all or part of the steps of the procedures provided in the method embodiments above may be implemented by a program instructing relevant hardware. The program may be stored in a computer readable storage medium. When the program runs, the procedures of the above method embodiment can be executed. The storage medium may be a magnetic disk, a optical disk, a read-only memory (Read-Only Memory, ROM) or a random access memory (Random Access Memory, RAM) etc.

The above merely discloses a preferred embodiment of the present invention, and does not intend to limit the scope of the invention. Therefore, equivalent variations made according to the claims of the present invention still fall within the scope of the present invention.

What is claimed is:

1. A method for discontinuous reception (DRX) configuration, the method comprising:
   receiving a DRX configuration message from a base station, wherein the DRX configuration message comprises at least one of a new DRX cycle configuration parameter and a new on-duration configuration parameter; and
   applying the new DRX cycle configuration parameter, and, according to a start state of an on-duration timer, determining a start time of the new on-duration configuration parameter;
   wherein, when the on-duration timer has been started, the on-duration timer is not expired, and a current subframe meets a start condition of the on-duration timer, the determining the start time of the new on-duration configuration parameter according to the start state of the on-duration timer comprises:
   restarting the on-duration timer; and
   applying the new on-duration configuration parameter;
   wherein when the on-duration timer has not been started, and at an application time of the new DRX cycle configuration parameter and under the new DRX cycle configuration parameter and the new on-duration configuration parameter, the current subframe is configured to monitor a physical downlink control channel (PDCCH), the determining the start time of the new on-duration configuration parameter according to the start state of the on-duration timer, comprises:
   starting the on-duration timer;
   wherein the method further comprises:
   according to the new on-duration configuration parameter, and a time difference between a time when a new DRX configuration cycle is configured and a latest time when a start condition of the on-duration timer is satisfied before the time when the new DRX configuration cycle is configured, determining a duration time for how long the new on-duration timer lasts after being started, or according to the new on-duration configuration parameter, determining the duration time for how long the new on-duration timer lasts after being started.

2. The method according to claim 1, wherein when the on-duration timer has been started, and based on the new DRX cycle configuration parameter and the new on-duration configuration parameter, a current subframe is not configured to monitor a physical downlink control channel (PDCCH), wherein the determining the start time of the new on-duration configuration parameter according to the start state of the on-duration timer comprises:
   stopping the on-duration timer that has been started,
   stopping monitoring the PDCCH, and
   determining the start time of the new on-duration configuration parameter according to the new DRX cycle configuration parameter.

3. The method according to claim 1, wherein
   when the on-duration timer has been started, and at the application time of the new DRX cycle configuration parameter and under the new DRX cycle configuration parameter and the new on-duration configuration parameter, the current subframe is configured to monitor the Physical Downlink Control Channel (PDCCH), the determining the start time of the new on-duration configuration parameter according to the start state of the on-duration timer, comprises:

restarting the on-duration timer; and wherein the method further comprises:

according to the new on-duration configuration parameter, the time difference between the time when the new DRX configuration cycle is configured and the latest time when the start condition of the on-duration timer is satisfied before the time when the new DRX configuration cycle is configured, determining the duration time for how long the new on-duration timer lasts after being restarted, or according to the new on-duration configuration parameter determining the duration time for how long the new on-duration timer lasts after being restarted.

4. A user equipment, comprising:

a processor coupled to a non-transitory processor-readable medium having processor-executable instructions stored thereon, the processor-executable instructions including a plurality of modules, the modules including:

a receiving module, configured to receive a discontinuous reception (DRX) configuration message from a base station, wherein the DRX configuration message comprises at least one of a new DRX cycle configuration parameter and new on-duration configuration parameter; and a configuration executing module, configured to:

apply the new DRX cycle configuration parameter received by the receiving module, and, according to a start state of an on-duration timer, determine a start time of the new on-duration configuration parameter of the DRX configuration message received by the receiving module, wherein, when the on-duration timer has been started, the on-duration timer is not expired, and a current subframe meets a start condition of the on-duration timer, the configuration executing module comprises a submodule configured to:

restart the on-duration time; and apply the new on-duration configuration parameter received by the receiving module;

wherein, when the on-duration timer has not been started, and at an application time of the new DRX cycle configuration parameter received by the receiving module and under the new DRX cycle configuration parameter and the new on-duration configuration parameter a current subframe is configured to monitor a physical downlink control channel (PDCCH), the configuration executing module comprises a submodule configured to:

start the on-duration timer; and according to the new on-duration configuration parameter and a time difference between a time when a new DRX configuration cycle is configured and a latest time when a start condition of the on-duration timer is satisfied before the time when the new DRX configuration cycle is configured, determine a duration time for how long the new on-duration timer lasts after being started, or, according to the new on-duration configuration parameter, determine the duration time for how long the new on-duration timer lasts after being started.

5. The user equipment according to claim 4, wherein when the on-duration timer has been started, and under the new DRX cycle configuration parameter and the new on-duration configuration parameter, the current subframe is not configured to monitor a physical downlink control channel (PDCCH), wherein the configuration executing module comprises a submodule configured to:

stop the on-duration timer which has been started;

stop monitoring the PDCCH; and, according to the new DRX cycle configuration parameter received by the receiving module, determine the start time of the new on-duration configuration parameter received by the receiving module.

6. The user equipment according to claim 4, wherein when the on-duration timer has been started, and at the application time of the new DRX cycle configuration parameter received by the receiving module and under the new DRX cycle configuration parameter and the new on-duration configuration parameter a current subframe is configured to monitor the physical downlink control channel (PDCCH), the configuration executing module comprises a submodule configured to:

restart the on-duration timer; and according to the new on-duration configuration parameter and a time difference between a time when a new DRX configuration cycle is configured and a latest time when a start condition of the on-duration timer is satisfied before the time when the new DRX configuration cycle is configured, determine a duration time for how long the new on-duration timer latest after being restarted, or, according to the new on-duration configuration parameter determine the duration time for how long the new on-duration timer lasts after being restarted.

7. A method for discontinuous reception (DRX) configuration, the method comprising:

receiving a DRX configuration message from a base station, wherein the DRX configuration message comprises at least one of a new DRX cycle configuration parameter and a new on-duration configuration parameter; and applying the new DRX cycle configuration parameter, and, according to a start state of an on-duration timer, determining a start time of the new on-duration configuration parameter;

wherein, when the on-duration timer has been started, the on-duration timer is not expired, and a current subframe meets a start condition of the on-duration timer, the determining the start time of the new on-duration configuration parameter according to the start state of the on-duration timer comprises:

restarting the on-duration timer; and applying the new on-duration configuration parameter;

wherein when the on-duration timer has been started, and at an application time of the new DRX cycle configuration parameter and under the new DRX cycle configuration parameter and the new on-duration configuration parameter, the current subframe is configured to monitor a physical Downlink Control Channel (PDCCH), the determining the start time of the new on-duration configuration parameter according to the start state of the on-duration timer, comprises:

restarting the on-duration timer; and wherein the method further comprises:

according to the new on-duration configuration parameter, the time difference between the time when the new DRX configuration cycle is configured and the latest time when the start condition of the on-duration timer is satisfied before the time when the new DRX configuration cycle is configured, determining the duration time for how long the new on-duration timer lasts after being restarted, or according to the new on-duration configuration parameter determining the duration time for how long the new on-duration timer lasts after being restarted.

8. A user equipment, comprising:

a processor coupled to a non-transitory processor-readable medium having processor-executable instructions stored thereon, the processor-executable instructions including a plurality of modules, the modules including:

a receiving module, configured to receive a discontinuous reception (DRX) configuration message from a base station, wherein the DRX configuration message comprises at least one of a new DRX cycle configuration parameter and new on-duration configuration parameter; and a configuration executing module, configured to:
  apply the new DRX cycle configuration parameter received by the receiving module, and, according to a start state of an on-duration timer, determine a start time of the new on-duration configuration parameter of the DRX configuration message received by the receiving module,
  wherein, when the on-duration timer has been started, the on-duration timer is not expired, and a current subframe meets a start condition of the on-duration timer, the configuration executing module comprises a submodule configured to:
  restart the on-duration timer; and
  apply the new on-duration configuration parameter received by the receiving module;
wherein when the on-duration timer has been started, and at an application time of the new DRX cycle configuration parameter received by the receiving module and under the new DRX cycle configuration parameter and the new on-duration configuration parameter a current subframe is configured to monitor a physical downlink control channel (PDCCH), the configuration executing module comprises a submodule configured to:
restart the on-duration timer; and
according to the new on-duration configuration parameter and a time difference between a time when a new DRX configuration cycle is configured and a latest time when a start condition of the on-duration timer is satisfied before the time when the new DRX configuration cycle is configured, determine a duration time for how long the new on-duration timer latest after being restarted, or, according to the new on-duration configuration parameter determine the duration time for how long the new on-duration timer lasts after being restarted.

* * * * *